(12) United States Patent
Sakata

(10) Patent No.: US 8,845,112 B2
(45) Date of Patent: Sep. 30, 2014

(54) VEHICLE OUTSIDE MIRROR DEVICE

(75) Inventor: Ikuo Sakata, Isehara (JP)

(73) Assignee: Ichikoh Industries, Ltd., Isehara-shi (JP)

(*) Notice: Subject to any disclaimer, the term of this patent is extended or adjusted under 35 U.S.C. 154(b) by 0 days.

(21) Appl. No.: 13/302,419

(22) Filed: Nov. 22, 2011

(65) Prior Publication Data

US 2012/0134039 A1    May 31, 2012

(30) Foreign Application Priority Data

Nov. 26, 2010 (JP) ................................. 2010-264175

(51) Int. Cl.
    *B60R 1/074*      (2006.01)
    *G02B 7/182*      (2006.01)
    *G02B 7/198*      (2006.01)
    *B60R 1/07*      (2006.01)

(52) U.S. Cl.
    CPC . *B60R 1/074* (2013.01); *B60R 1/07* (2013.01); *G02B 7/182* (2013.01); *G02B 7/198* (2013.01)
    USPC .......................................... 359/841; 359/877

(58) Field of Classification Search
    CPC .......... B60R 1/07; B60R 1/074; G02B 7/182; G02B 7/1821; G02B 7/198
    USPC .......................................... 359/841, 872, 877
    See application file for complete search history.

(56) References Cited

U.S. PATENT DOCUMENTS

| | | | | |
|---|---|---|---|---|
| 4,919,526 | A * | 4/1990 | Umekawa et al. ............ | 359/841 |
| 6,811,270 | B2 * | 11/2004 | Yoshida ........................ | 359/841 |
| 6,866,392 | B2 * | 3/2005 | Hayashi ........................ | 359/841 |
| 6,871,969 | B2 | 3/2005 | Yamauchi et al. | |
| 6,874,896 | B2 * | 4/2005 | Yoshida ........................ | 359/841 |
| 7,104,660 | B2 * | 9/2006 | Sakata et al. .................. | 359/841 |
| 7,290,890 | B2 * | 11/2007 | Yoshida et al. ............... | 359/841 |
| 7,427,142 | B2 * | 9/2008 | Onuki ........................... | 359/841 |
| 7,441,912 | B2 * | 10/2008 | Onuki ........................... | 359/841 |
| 7,488,081 | B2 * | 2/2009 | Yoshida et al. ............... | 359/841 |
| 7,562,992 | B2 * | 7/2009 | Onuki ........................... | 359/877 |
| 7,652,403 | B2 * | 1/2010 | Sakata ........................... | 310/71 |
| 2003/0011907 | A1 | 1/2003 | Yamauchi et al. | |
| 2011/0235200 | A1 | 9/2011 | Sakata | |

FOREIGN PATENT DOCUMENTS

| | | |
|---|---|---|
| GB | 2 381 251 B | 4/2003 |
| JP | 2003-025916 A | 1/2003 |
| JP | 2005-193623 A | 7/2005 |
| JP | 2005-319929 A | 11/2005 |
| JP | 2006-264597 A | 10/2006 |
| JP | 2011-201447 A | 10/2011 |

* cited by examiner

*Primary Examiner* — Ricky D Shafer
(74) *Attorney, Agent, or Firm* — Foley & Lardner LLP

(57) ABSTRACT

The present invention has: a first worm gear 29 that is rotatably borne on a gear case 11 and a bearing member 16, the first worm gear being coupled to an output shaft 24 of a motor 13; and a helical gear that is geared with the first worm gear 29. In the gear case 11 and the first worm gear 16, an engagement recessed portion 42 and an engagement protrusive portion 43 configured to engage with each other are provided. At the engagement protrusive portion 43 of the bearing member 16, a first press-in fixing protrusive portion 44 configured to be pressed-in and fixed to an engagement recessed portion 42 of the gear case 11 is provided. As a result, according to the present invention, a rotational center O1 of the first worm gear 29 is positioned at the normal rotational center.

5 Claims, 10 Drawing Sheets

VEHICLE OUTSIDE MIRROR DEVICE

CROSS REFERENCE TO RELATED APPLICATIONS

This application claims priority of Japanese Patent Application No. 2010-264175 filed on Nov. 26, 2010. The contents of this application are incorporated herein by reference in their entirety.

BACKGROUND OF THE INVENTION

1. Field of the Invention

The present invention relates to a vehicle outside mirror device enabling a mirror assembly to be mounted to enable rotation (tilting or turning) on a vehicle body via an electrically driven storage unit and a base. In other words, the present invention relates to a vehicle outside mirror device such as an electrically storage type door mirror, for example.

2. Description of the Related Art

A vehicle outside mirror devices of such type is conventionally known (for example, Japanese Unexamined Patent Application Publication No. 2003-25916). Hereinafter, the conventional vehicle outside mirror devices will be described. One of the conventional vehicle outside mirror devices (Japanese Unexamined Patent Application Publication No. 2003-25916) is provided with: an input gear that is rotatably borne on a first frame and a bush, the input gear being coupled to a motor shaft of a motor; and a middle gear that is geared with the input gear. Another one of the conventional vehicle outside mirror devices (Japanese Unexamined Patent Application Publication No. 2005-319929) is provided with a motive force transmission mechanism having: a worm gear that is rotatably borne on a cover and a holder, the worm gear being coupled to a rotary shaft of an electromotive motor; and a gear mechanism that is geared with the worm gear. Still another one of the conventional vehicle outside mirror devices (Japanese Patent Application Publication No. 2006-264597) is provided with: a first worm gear that is rotatably borne on a first bearing portion and a second hearing portion, the first worm gear being coupled to a rotary shaft of an electromotive motor; and a first helical gear that is geared with the first worm gear. A further one of the conventional vehicle outside mirror devices (Japanese Unexamined Patent Application Publication No. 2005-193823) is provided with: a first worm gear shaft that is rotatably borne on a distal end side bearing portion and a proximal end side bearing portion, the first worm gear shaft being coupled to a drive shaft of an electric motor; and a first worm wheel that is geared with the first worm gear.

In such vehicle outside mirror devices, it is important that: a rotational center (a rotational centerline) of the input gear that is borne on the first frame and the bush, of Japanese Patent Unexamined Patent Application No. 2003-25916; a rotational center (a rotational centerline) of the worm gear that is borne on the cover and the holder, of the Japanese Unexamined Patent Application Publication No. 2005-319929; a rotational center (a rotational centerline) of the first worm gear that is borne on the first bearing portion and the second bearing portion, of Japanese Patent Application Publication No. 2006-264597); and a rotational center (a rotational centerline) of the first worm gear shaft that is borne on the distal end side bearing portion and the proximal end side bearing portion, of the Japanese Patent Application Publication No. 2005-193823, are positioned at a normal rotational center (a rotational centerline).

For example, if the rotational center of the input gear of the Japanese Unexamined Patent Application Publication No. 2003-25916 is not positioned at the normal rotational center and then if there is dispersion between the rotational center of the input gear and the normal rotational center, there occurs dispersion in distance between the rotational center of the input gear and a rotational center of the middle gear, of the Japanese Unexamined Patent Application Publication No. 2003-25916. Thus, smooth transmission of a rotational force is not performed between the input gear and the middle gear, a load on the respective constituent elements or an actuation noise can occur. This is also true as to other disclosures, Japanese Unexamined Patent Application Publication No. 2005-319929, Japanese Unexamined Patent Application Publication No. 2006-264597, and Japanese Unexamined Patent Application Publication No. 2005-193823. Therefore, in such vehicle outside mirror devices, it is important that the rotational center of the input gear of Japanese Unexamined Patent Application Publication No. 2003-25916; the rotational center of the worm gear of the Japanese Unexamined Patent Application No. 2005-319929; the rotational center of the first worm gear of Japanese Unexamined Patent Application Publication No. 2006-264597; and the rotational center of the first worm gear of Japanese Unexamined Patent Application Publication No. 2005-193823 are positioned at the normal rotational center.

The present invention has been made in order to solve the above-described problem that it is important that the rotational center of a gear at a first step is positioned at a normal rotational center.

SUMMARY OF THE INVENTION

A vehicle outside mirror device of a first aspect in which a mirror assembly is rotatably mounted on a vehicle body via an electrically driven storage unit and a case, the electrically driven storage unit comprising:

a shaft holder that is fixed to the base;

a shaft that is provided on the shaft holder;

a casing which is rotatably mounted on the shaft, and in which the mirror assembly is to be mounted;

a motor and rotational force transmission mechanism that are housed in the casing, for electrically driving the mirror assembly to rotate relative to the shaft; and a bearing member that is housed in the casing, wherein the rotational force transmission mechanism having: at least a gear at a first step, which is rotatably borne on the casing and the bearing member, the gear being coupled to an output shaft of the motor; and a gear at a second step, which is geared with the gear at the first step, at the casing and at the bearing member, engagement portions configured to engage with each other are respectively provided, and at least one of the engagement portion of the casing and the engagement portion of the bearing member, a press-in fixing protrusive portion for casing bearing member is provided which is elastically deformed and then is fixed to be pressed into the engagement portion of a counterpart when the engagement portion of the casing and the engagement portion of the bearing member are brought into press-in engagement with each other.

The vehicle outside mirror device of a second aspect according to the first aspect, wherein the bearing member is formed of a member that is softer in material rigidity than the casing, and the press-in fixing protrusive portion for casing bearing member is provided at the bearing member.

The vehicle outside mirror device of a third aspect according to the first aspect, wherein at the motor and the bearing member, engagement portions configured to engage with each other are respectively provided, and at least one of the engagement portion of the motor and the engagement portion of the bearing member, there is a press-in fixing protrusive portion for motor bearing member, which is elastically deformed and then is fixed to be pressed into the engagement portion of a counterpart when the engagement portion of the motor and the engagement portion of the bearing member are brought into press-in engagement with each other.

The vehicle outside mirror device according to the third aspect, wherein the bearing member is formed of a member that is softer in material rigidity than the motor, and the press-in fixing protrusive portion for motor bearing member is provided at the bearing member.

The vehicle outside mirror device according to the first aspect, wherein the press-in fixing protrusive portion for casing bearing member and the press-in fixing protrusive portion for motor bearing member are formed in a rib shape that extends in a direction of a rotational centerline of the gear of the first stage and at least three protrusive portions are provided.

According to a vehicle outside mirror device of a first aspect of the present invention, when an engagement portion of a casing and an engagement portion of a bearing member are brought into press-in engagement with each other, a press-in fixing protrusive portion for casing bearing member of at least one of the engagement portions of the engagement portion of a casing and an engagement portion of the bearing member is elastically deformed and then are fixed to be pressed into the engagement portion of the counterpart. Thus, the vehicle outside mirror device of the first aspect of the present invention is capable of absorbing a manufacture tolerance (manufacture dispersion) in casing and bearing member, wherein the casing and the bearing member are reliably fixed to each other without a backlash, so that the rotational center (the rotational centerline) of the gear at the first step that is borne on the casing and the bearing member can be positioned at the normal rotational center (the rotational centerline). In this manner, the vehicle outside mirror device of the first aspect of the present invention is capable of eliminating or reducing dispersion in distance between the rotational center of the gear at the first step and a rotational center of a gear at a second step to its required minimum. As a result, smooth transmission of rotational force is performed between the gear at the first step and the gear at the second step, making it possible to eliminate or reduce a load on the respective constituent elements or generation of an actuation noise to its required minimum.

Moreover, according to the vehicle outside mirror device of the first aspect of the present invention, a press-in fixing protrusive portion for casing bearing portion is provided in at least one of the engagement portions of the casing and the engagement portions of the bearing member, and therefore, there would be no worrying about a case that the number of parts increase and then manufacturing costs increase.

In addition, according to a vehicle outside mirror device of a second aspect of the present invention, a press-in fixing protrusive portion for casing bearing member, of the bearing member that is formed of a member that is softer in material rigidity than casing, is elastically deformed and then is fixed to be pressed into en engagement portion of the casing. Thus, the vehicle outside mirror device of the second aspect of the present invention is capable of further reliably absorbing a manufacture tolerance (manufacture dispersion) in casing and bearing member, making it possible to further eliminate or reduce a load on the respective constituent elements or generation of an actuation noise to its required minimum.

Moreover, according to the vehicle outside mirror device of the second aspect of the present invention, the casing is formed of a member that is harder in material than the bearing member, and therefore, the gear at the second step is rotatably borne on this casing, whereby the casing is hardly affected by a resistive force of the gear at the second step, for example. As a result, it becomes possible to further eliminate or reduce a load on the respective constituent elements or generation of an actuation noise to its required minimum.

Further, according to a vehicle outside mirror device of a third aspect of the present invention, when an engagement portion of a motor and an engagement portion of a bearing member are brought into press-in engagement with each other, a press-in fixing protrusive portion for the motor bearing member of at least one of the engagement portions of the motor and the engagement portions of the bearing member is elastically deformed and then are fixed to be pressed into the engagement portion of the counterpart. Thus, the vehicle outside mirror device of the third aspect of the present invention is capable of absorbing a manufacture tolerance (manufacture dispersion) in motor and bearing member, wherein the motor and the bearing member are reliably fixed to each other without a backlash, so that the rotational center (the rotational centerline) of the gear at the first step, which is coupled to the motor, and is borne on the bearing member, can be further precisely positioned at the normal rotational center (the rotational centerline). In this manner, the vehicle outside mirror device of the third aspect of the present invention is capable of eliminating or reducing dispersion in distance the rotational center of the gear at the first step and the rotational center of the gear at the second step to its required minimum. As a result, smooth transmission of rotational force is performed between the gear at the first step and the gear at the second step, making it possible to further eliminate or reduce a load on the respective constituent elements or generation of an actuation noise to is required minimum.

Moreover, according to the vehicle outside mirror device of the third aspect of the present invention, a press-in fixing protrusive portion for motor bearing member is provided in at least one of the engagement portions of the motor and the engagement portions of the bearing member, and therefore, there would be no worrying about a case in which the number of parts increases and then manufacturing costs increase.

Furthermore, according to a vehicle outside mirror device of a fourth aspect of the present invention, a press-in fixing protrusive portion for casing bearing member, of the bearing member that is formed of a member that is softer in material rigidity than the motor is elastically deformed and then is fixed to be pressed into the engagement portion of the motor. Thus, the vehicle outside mirror device of the fourth aspect of the present invention is capable of further reliably absorbing a manufacturing tolerance (manufacturing dispersion) in motor and bearing member, making it possible to further eliminate or reduce a load on the respective constituent elements or generation of an actuation noise to its required minimum.

Still furthermore, according to a vehicle outside mirror device of a fifth aspect of the present invention, a press-in fixing protrusive portion for casing bearing member and a press-in fixing protrusive portion for motor bearing member are formed in a rib shape that extends in a rotational centerline direction of the gear at the first step, and at least three protrusive portions are respectively provided, so that the rotational center (the rotational centerline) of the gear at the first step can be further precisely positioned at the normal rotational center (the rotational centerline). In this manner, the vehicle outside mirror device of the fifth aspect of the present invention is capable of eliminating or reducing dispersion in distance between the rotational center of the gear at the first step and the rotational center of the gear at the second step to its required minimum. As a result, smooth transmission of rotational force is performed between the gear at the first step and the gear at the second step, making it possible to further eliminate or reduce a load on the respective constituent elements or generation of an actuation noise to its required minimum.

DESCRIPTION OF THE PREFERRED EMBODIMENTS

Hereinafter, an exemplary embodiment of a vehicle outside mirror device according to the present invention will be described with reference to the drawings. It should be noted that these exemplary embodiments do not limit the present invention.

Exemplary Embodiment

Description of Configuration

Figure 1:
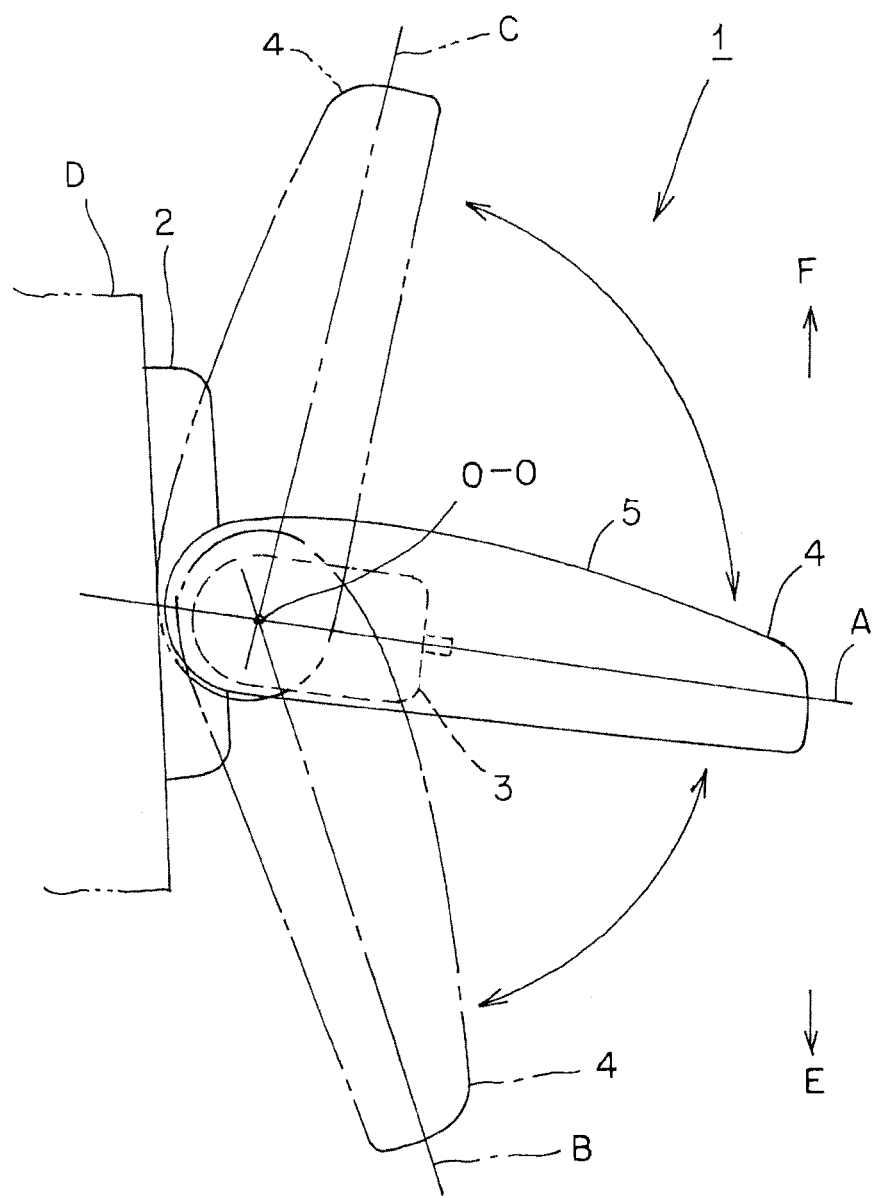
FIG. 1 is a plan view of a use state showing an exemplary embodiment of a vehicle outside mirror device according to the present invention.

Hereinafter, a configuration of the vehicle outside mirror device in the exemplary embodiment will be described. In FIG. 1, reference numeral 1 designates the vehicle outside mirror device in the exemplary embodiment. In this example, an electrically storage type door mirror device (an electrically driven storage type door mirror) is provided. The electrically driven storage type door mirror 1 is equipped at a respective one of the left and right doors of an automobile. The electrically driven storage type door mirror 1 of the exemplary embodiment is equipped at the right side door of the automobile, and an electrically driven storage type door mirror device equipped at the left side door of the automobile is reversed at the left and right from the electrically driven storage type door mirror device 1 of the exemplary embodiment.

In the electrically driven storage type door mirror device 1, as shown in FIG. 1, a mirror assembly 4 is the one that is rotatably mounted on a vehicle body (an automobile door) D via an electrically driven storage unit 3 and a base (a mirror base) 2. The base 2 is the one that is fixed to the door D.

The aforementioned mirror assembly 4 is formed of a mirror housing 5, a mount bracket (not shown), a power unit (not shown), and a mirror (a mirror unit), although not shown. In the mirror housing 5, the mount bracket is mounted. On the mount bracket, the power unit is mounted. On the power unit, the mirror is mounted to be able to tilt vertically and horizontally.

The electrically driven storage unit 3 is provided with: as shown in FIGS. 2 to 7, a shaft holder 9; a shaft 10; a gear case 11 and a cover 12, a respective one of which serves as a casing; a motor 13; a deceleration mechanism 14 and a clutch mechanism 15, each of which serves as a rotation force transmission mechanism; a bearing member 16; an interposing member 6; an electrically driven rotation range restricting mechanism (See Japanese Patent Application No. 2010-071463) and a buffering mechanism (See Japanese Patent Application No. 2010-071463).

The shaft holder 9 is fixed to the base 2. The shaft 10 is integrally provided at a center of one face (a top face) of the shaft holder 9. The shaft 10 is formed in a hollow shape, and is configured so that a harness (not shown) is inserted through the shaft. On the shaft 10, the gear case 11 and the cover 12 are rotatably mounted around a rotational center O-O of the shaft 10. The mount bracket of the mirror assembly 4 is mounted on the gear case 11. In the gear case 11 and the cover 12, there are housed: the motor 13; the deceleration mechanism 14 and the clutch mechanism 15, a respective one of which serves as the rotation force transmission mechanism; the bearing member 16; the interposing member 6; the electrically driven rotation range restricting mechanism, and the buffering mechanism, respectively.

The gear case 11, as shown in FIGS. 2 to 6, is formed in a sectional recessed shape of which one side (a lower side) is closed and the other side (an upper side) is opened. In other words, in the gear case 11, there is provided a housing portion 18 formed in a sectional recessed shape of which the shaft holder 9 side is closed and the cove 12 side is opened. An insert hold (not shown) is provided at a closed portion of the gear case 11. The shaft 10 is inserted into the insert hole. As a result, the gear case 11 is rotatably mounted on the shaft 10 so as to be rotatable around the rotational center O-O of the shaft 10.

Figure 2:
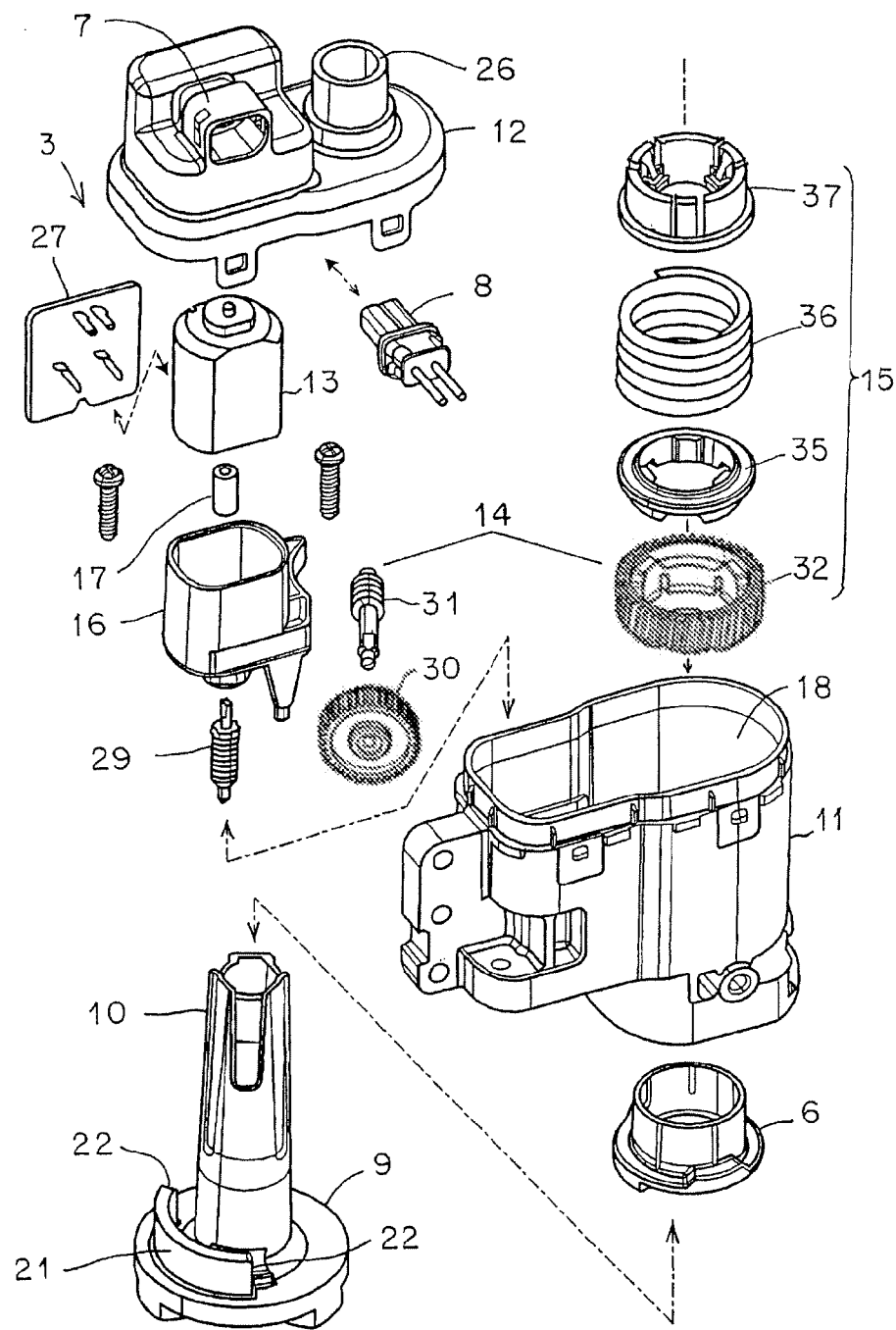
FIG. 2 is an exploded perspective view showing an electrically driven storage unit, similarly.
Figure 3:
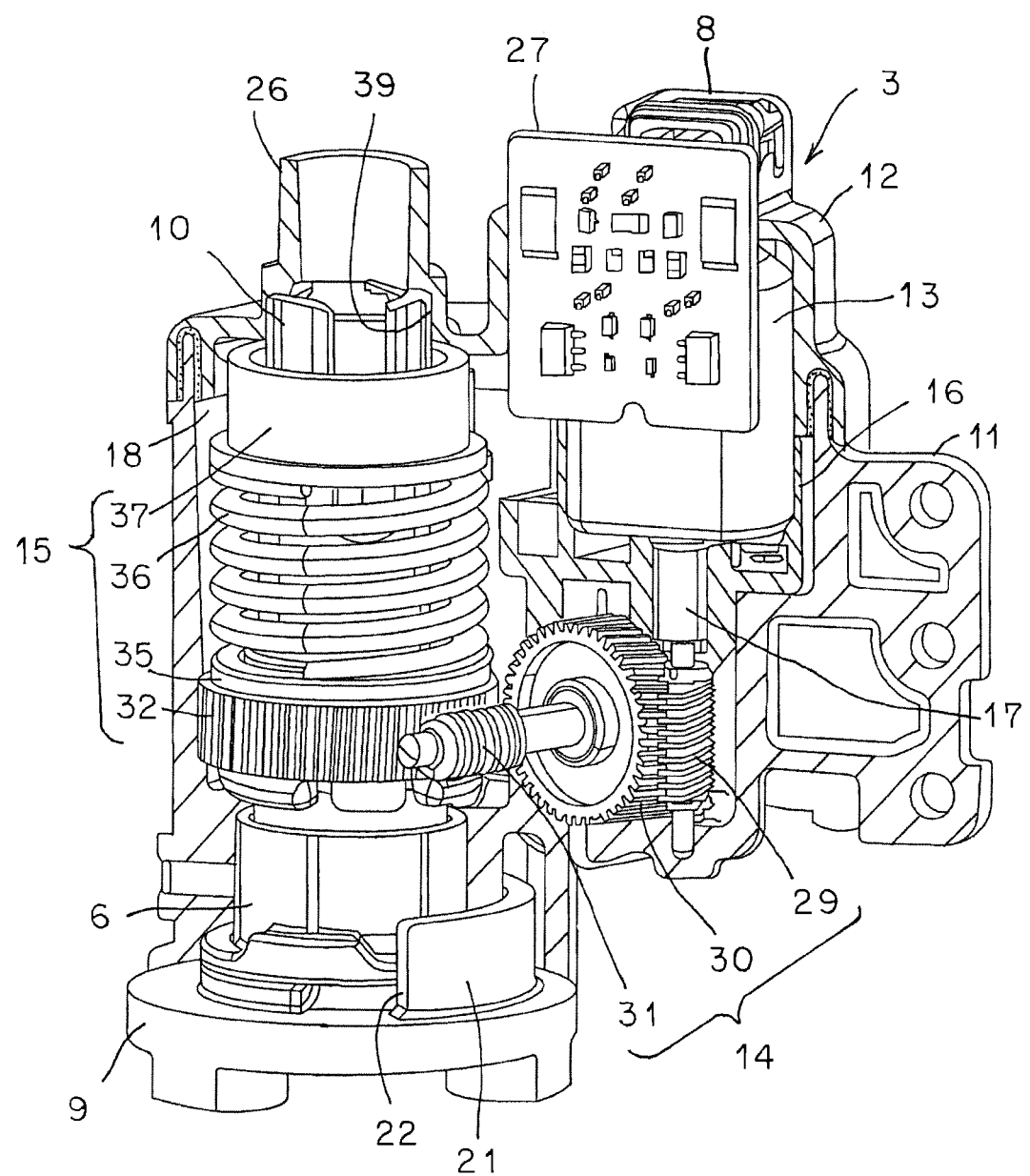
FIG. 3 is a perspective view showing an electrically driven storage unit, although a casing is not partially shown, similarly.

As shown in FIG. 2 and FIG. 3, an arc shaped stopper protrusive portion 21 around the rotational center O-O of the shaft 10 is integrally provided on a top face of the shaft holder 9. Stopper faces 22 are provided on both end faces of the stopper protrusive portion 21, respectively. On the other hand, an arc shaped guide groove (not shown) around the rotational center O-O of the shaft 10 is provided on a bottom face of the gear case 11. Stopper faces are provided on both end faces of the guide groove, respectively.

The stopper protrusive portion 21 of the shaft holder 9 is engaged with the guide groove of the gear case 11. The stopper protrusive portion 21 and the guide groove configure a guide member serve as a guide when the gear case 11 rotates around the rotational center O-O of the shaft 10 relative to the shaft holder 9, in other words, as shown in FIG. 1, when the mirror assembly 4 rotates between a use location A and a storage location B relative to the base 2 and between the use location A and a forward tilting location C backward (in the clockwise direction seen from the top) or forward (in the counterclockwise direction seen from the top). In FIG. 1, reference numeral E designates a backside of a vehicle and reference numeral F designates a foreside of the vehicle.

In addition, the stopper face 22 of the stopper protrusive portion 21 and the stopper face of the guide groove configures a stopper member in which, before the mirror assembly 4 rotates and abuts against the door D in the clockwise direction seen from the top or in the counterclockwise direction seen from the top, the stopper face 22 of the stopper protrusive portion 21 and the stopper face of the guide groove abut against each other and then rotation of the mirror assembly 4 is restricted, the stopper member serving as a stopper for avoiding abutment of the mirror assembly 4 against the door D.

The cover 12, as shown in FIG. 2 and FIG. 3, is formed in a sectional inverted recessed shape of which one side (an upper side) is closed and the other side (a lower side) is opened. In other word, on the cover 12, there is provided a housing portion 18 formed in a sectional inverted recessed shape of which one side, i.e., the gear case 11 side is opened and the other side is opened. On the cover 12, a harness insert cylinder portion 26 which communicates with the shaft 10 formed in a hollow shape is integrally provided.

In addition, a socket portion 7 is provided at the cover 12. On the socket portion 7, a connector 8 which is electrically connected to a power supply (a battery) side, although not shown, electrically intermittently connects thereto and is mounted in a mechanically detachable manner. A board 27 is mounted on the socket portion 7. The board 27 is electrically connected to the motor 13. A switch circuit for controlling the drive or stoppage of the motor 13 is packaged on the board 27. As a result, the motor 13 is electrically connected to the connector 8 via the board 27 and the socket portion 7.

The cover 12 is engagingly fixed to the outside of an opening rim of the housing portion 18 of the gear case 11. In the housing portion 18 inside the gear case 11 and the cover 12, the motor 3, the deceleration mechanism 14, the clutch mechanism 15, the bearing member 16, the interposing member 6, the electrically driven rotation range restricting mechanism, the buffering mechanism, and the board 27 are fixedly housed by means of screws or the like.

In addition, on the cover 12, an insert hole 39 is provided so as to communicate with the harness insert cylinder portion 26. The shaft 10 is inserted into the insert hole 39. As a result, the cover 12 is mounted on the shaft 10, together with the gear case 11, so as to be rotatable around the rotational center O-O of the shaft 10.

The aforementioned bearing member 16 is formed of a member that is softer in material rigidity than the gear case 11 serving as a casing and a housing of the motor 13, for example, POM (polyacetal or acetal resin). The bearing member 16, as shown in FIG. 4 to FIG. 7, is provided with: a plate portion 19; a motor housing portion 20 formed in a sectional recessed shape, which is integrally provided on one face (a top face) of the plate portion 19; a joint housing portion 23 formed in a hollow cylindrical shape, which is integrally provided on another face (a bottom face) of the plate portion 19.

One end face (a lower end face) at the side of the plate portion 19 of the motor housing portion 20, except a center portion, is closed by means of the plate portion 19. In addition, the other end face (a top end face) that is opposed to the plate portion 19 of the motor housing portion 20 is opened. One end face (a top end face) at the side of the plate portion 19 of the joint housing portion 23 is opened so as to communicate with the motor housing portion 20. In addition, the other end face (a lower end face) that is opposed to the plate portion 19 of the joint housing portion 23 is closed.

The motor 13 is fixed to be housed in the motor housing portion 20 of the bearing member 16. The bearing member 16 that is configured to house and fix the motor 13 is fixed to be housed in the gear case 11 and the housing portion 18 in the cover 12.

The deceleration mechanism 14 and the clutch mechanism 15, a respective one of which serves as the rotation force transmission mechanism, as shown in FIG. 2 and FIG. 3, are the ones that are housed in the housing portion 18 of the gear case 11 and the cover 12, that are provided between an output shaft 24 and the shaft 10, of the motor 13, and that transmit a rotation force of the motor 13 to the shaft 10. The motor 13, the deceleration mechanism 14, and the clutch mechanism 15, a respective one of which serves as the rotation force transmission mechanism, are the ones that are electrically driven relative to the shaft 10 to rotate the mirror assembly 4 around the rotational center O-O of the shaft 10.

The deceleration mechanism 14 is comprised of: a first worm gear 29 which serves as a first step gear; a helical gear 30 which serves as a second step gear engaging with the first worm gear 29; a second worm gear 31 which serves as a third step gear; and a clutch gear 32 which serves as a final step gear with which the second worm gear 31 engages.

Figure 4:
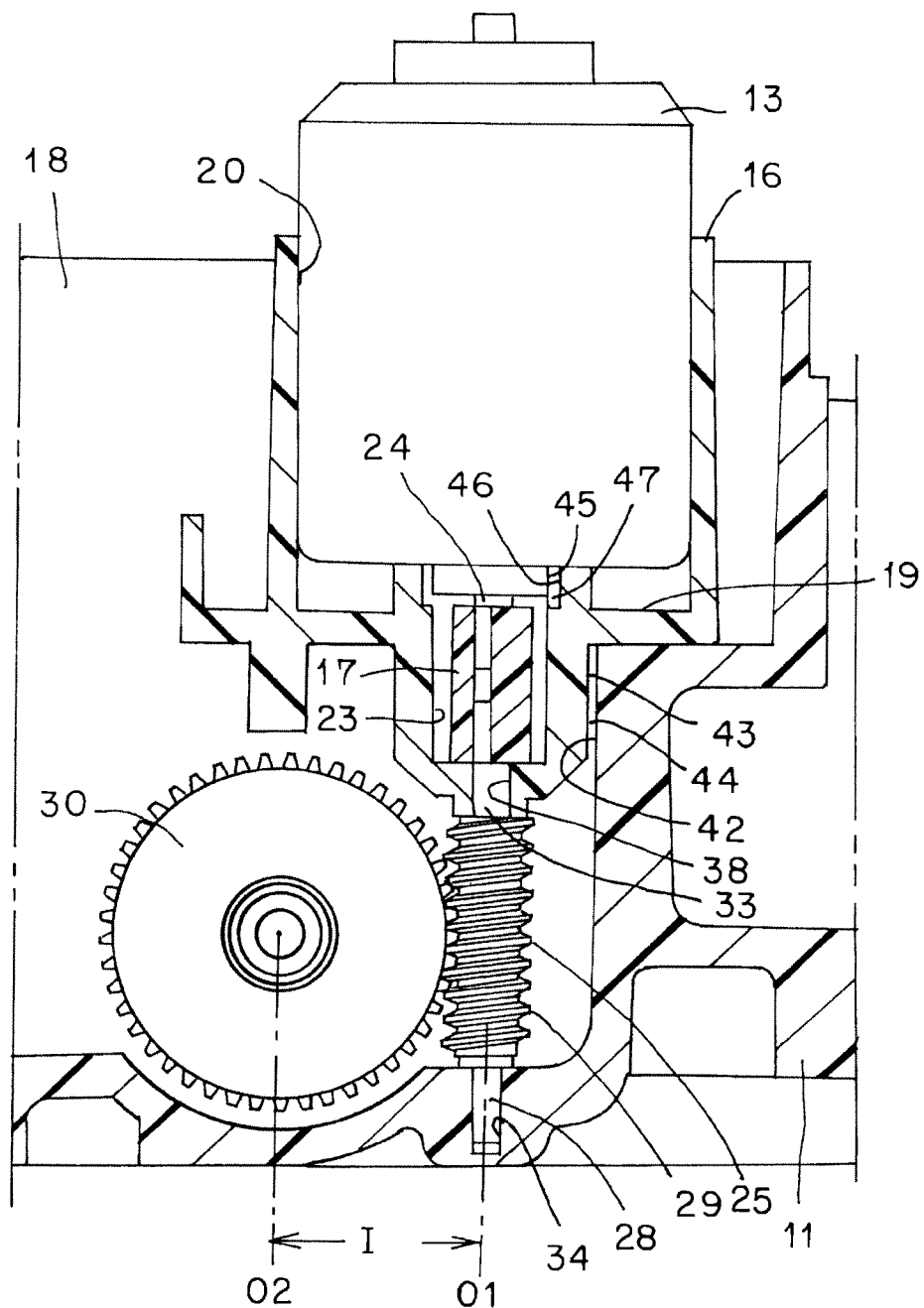
FIG. 4 is a partially longitudinal sectional view (a partially vertical sectional view) showing essential portions of an electrically driven storage unit, similarly.

As shown in FIG. 4, the first worm gear 29 is formed of a gear portion 25 and shaft portions 28 and 33 that are provided at both ends of the gear portion 25. In the gear case 11, a bearing portion 34 is provided. At a closed portion on the other end face of the joint housing portion 23 of the bearing member 16 that is fixed to the gear case 11, a bearing portion 38 is provided on one straight line with the bearing portion 34 of the gear case 11. The shaft portions 28 and 33 of the first worm gear 29 are respectively rotatably borne on the bearing portion 34 of the gear case 11 and the bearing portion 38 of the bearing member 16.

The shaft portion 33 of the first worm gear 29 is coupled to the output shaft 24 of the motor 13 via a joint 17. The joint 17 is housed in the joint housing portion 23 of the bearing member 16.

the helical gear 30 and the second worm gear 31 are integrally coupled to each other. The helical gear 30 and the second worm gear 31 are rotatably borne on the gear case 11 or the gear case 11 and the bearing member 16.

The clutch mechanism 15 is provided with the clutch gear 32, a clutch holder 35, a spring 36, and a push nut 37. The clutch mechanism 15 is configured by sequentially engaging the clutch gear 32, the clutch holder 35, and the spring 36 with the shaft 10, locking the push nut 37 with the shaft 10, and then, establishing the spring 36 in a compressed state. The clutch gear 32 and the clutch holder 35 are linked with each other in a intermittently connectable manner. The second worm gear 31 of the deceleration member 14 and the clutch gear 32 of the clutch mechanism 15 engage with each other, whereby a rotation force of the motor 13 is transmitted to the shaft 10.

The clutch gear 32 and the clutch holder 35 configure the clutch mechanism 15. The clutch gear 32 is mounted on the shaft 10 so as to be rotatable around the rotational center O-O of the shaft 10 and to be movable in an axial direction. The clutch holder 35 is mounted on the shaft 10 in an engaged state so as to disable rotation and to be movable in an axial direction.

As shown in FIGS. 10 to 15, a plurality of, i.e., three mountain-shaped clutch protrusive portions 40 and three valley-shaped clutch portions 41 are provided at equal intervals on a face which is mutually opposite to the clutch gear 32 and the clutch holder 35, i.e., on one face (an upper face) side of the clutch gear 32 and one face (a bottom face) side of the clutch holder 35. When the clutch protrusive portion 40 and the clutch recessed portion 41 are established in an engaged state, the clutch gear 32 and the clutch holder 35 are in a continuous state (a non-disengaged state or a connected state); or when the clutch protrusive portion 40 and the clutch recessed portion 41 are in a disengaged state, the clutch gear 32 and the clutch holder 35 are in a discontinuous state (an engaged state or a disconnected state). The clutch mechanism 15 is disallowed to disengage with an electrically driven rotation force of the motor 13 and the rotation force transmission mechanism (the deceleration mechanism 14 and the clutch mechanism 15) and disengages with a force which is equal to or greater than the electrically driven rotation force so as to be able to rotate the mirror assembly 4 relative to the shaft 10.

Among the clutch members, the other face (a bottom face) side of the clutch gear 32 abuts against one face (a top face) of a bottom part of the gear case 11 directly or via a washer (not shown). On the other hand, among the clutch members, the other face (a top face) side of the clutch holder 35 directly abuts against the spring 36.

Figure 6:
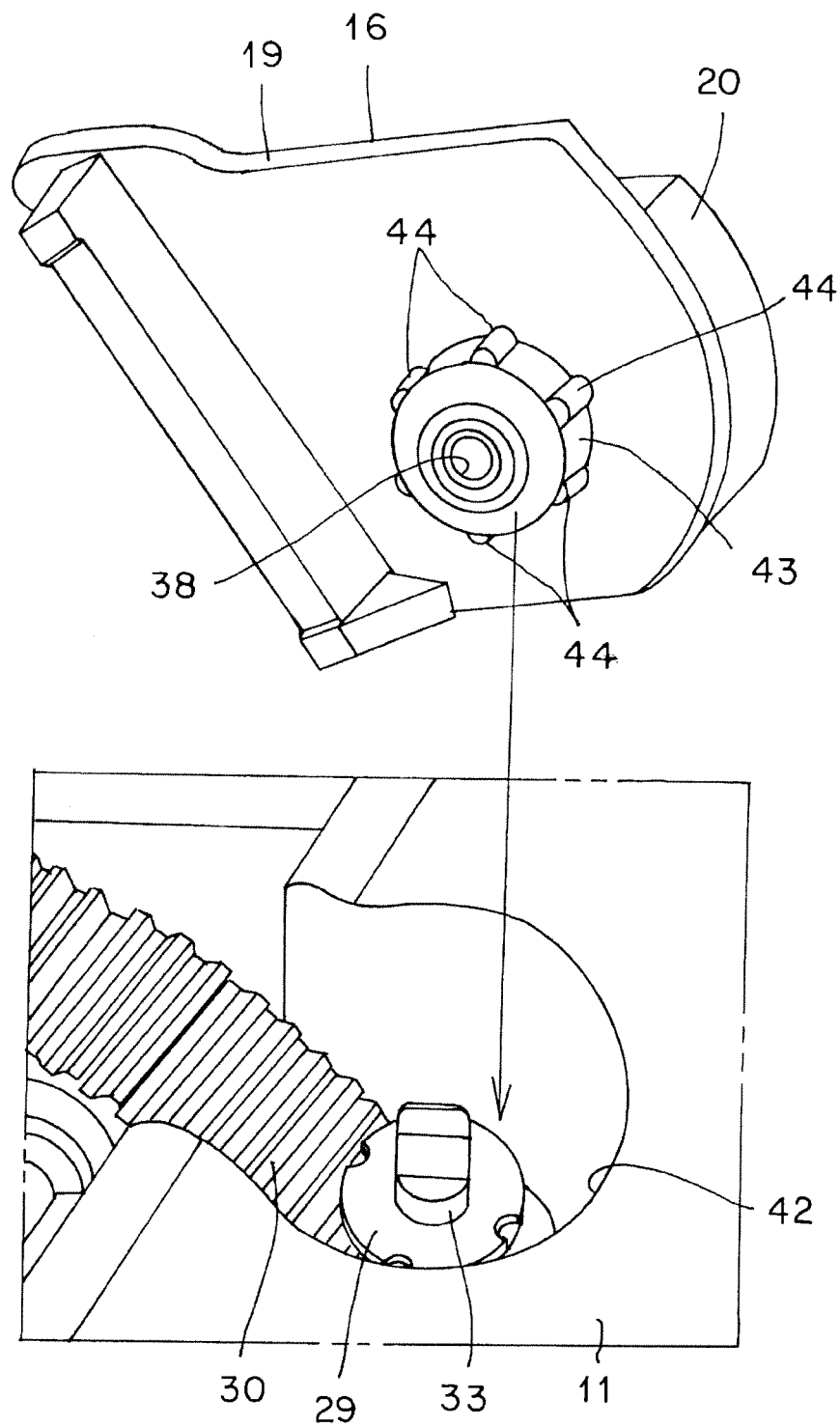
FIG. 6 is an explanatory view showing a state in which an engagement portion of a bearing member is brought into press-in engagement with an engagement portion of a casing, similarly.
Figure 8A:
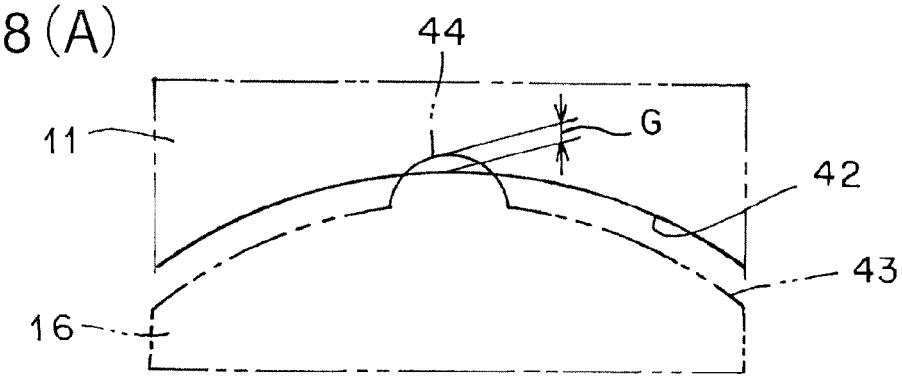
FIG. 8 is an explanatory view showing a state in which an engagement portion of a bearing member and an engagement portion of a casing are fixed to be pressed into each other, similarly.
Figure 8B:
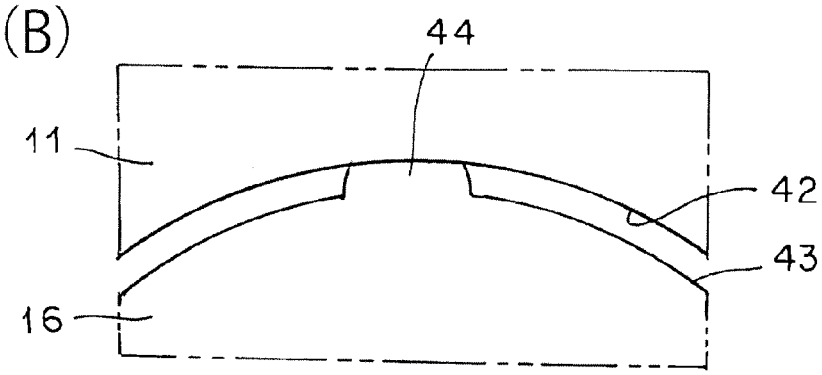

The interposing member 6 is provided between the shaft holder 9 and the gear case 11. The interposing member 6 is comprised of an inexpensive member with its low friction and frictional wear proof property, for example, a POM (polyacetal or an acetal resin) or a PPS (polyphenylene sulfide). The interposing member 6 is formed in a hollow-shaped cylindrical shape having a through hole (not shown) through which the shaft 10 is to be inserted and having a jaw portion at one end part (a lower end part). The interposing member 6 is mounted on the shaft 10 so as to be rotatable around the rotational center O-O of the shaft 10. As shown in FIG. 6 and FIG. 8, on one face (a bottom face) of the jaw portion of the interposing member 6, two arc-shaped protrusive portions (not shown) around the rotational center O-O of the shaft 10 are integrally provided at equal intervals. Abutment faces (not shown) of the electrically driven rotation range restricting mechanism are provided on both end faces of the arc-shaped protrusive portion, respectively. In addition, on the other face (a top face) of the jaw portion of the interposing member 6, a plurality of trapezoidal engagement protrusive portions (not shown) which serve as engagement portions of the buffering mechanism, two pieces in this example, are integrally provided at equal intervals on a circumference around the rotational center O-O of the shaft 10.

Figure 7:
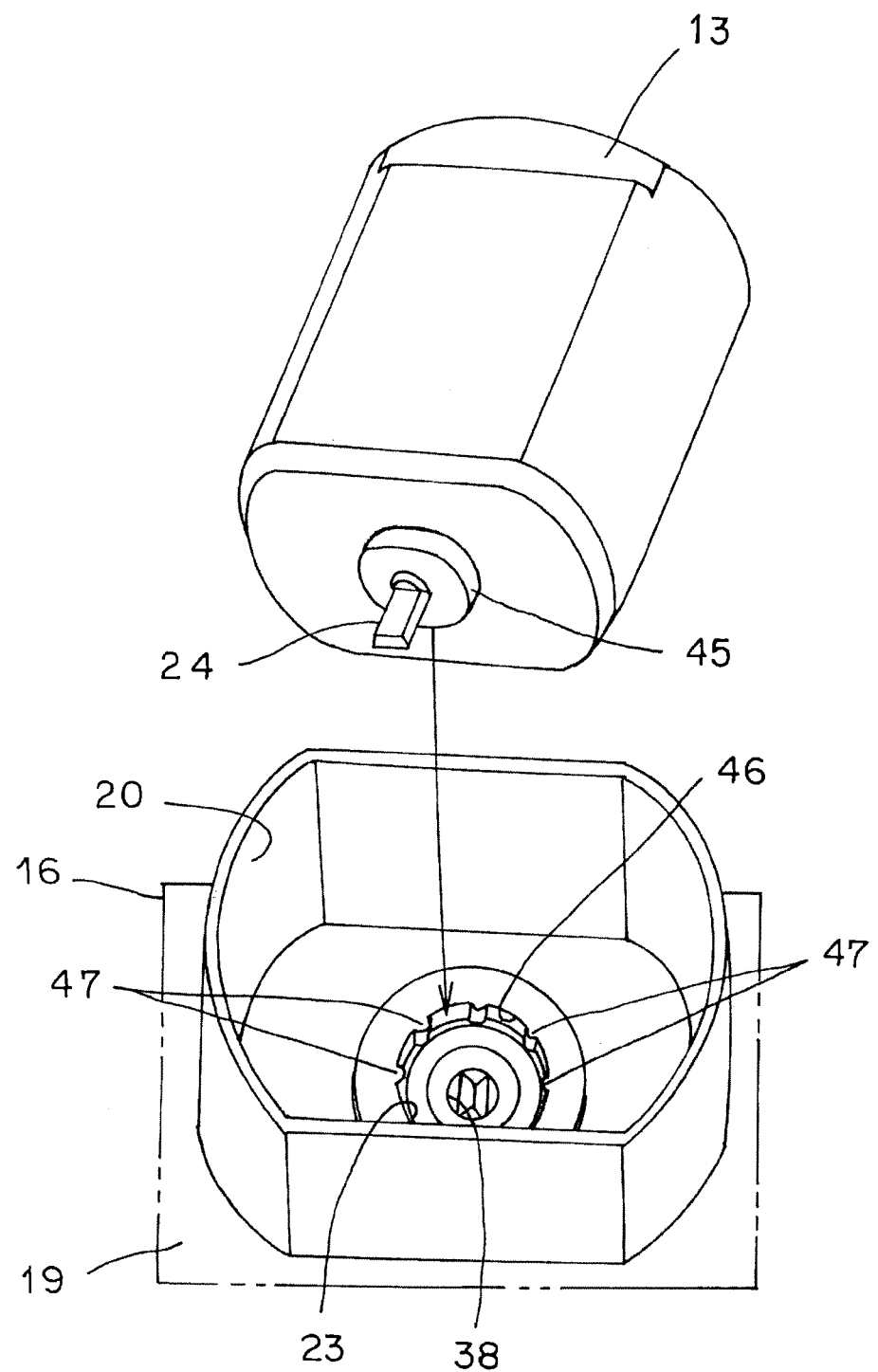
FIG. 7 is an explanatory view showing a state in which an engagement portion of a motor is brought into press-in engagement with an engagement portion of a bearing member, similarly.

The shaft holder 9 and the shaft 10 are comprised of a member with its high rigidity, for example, a die cast or a resin. As shown in FIG. 7 and FIG. 8, on a top face of the shaft holder 9, two arc-shaped protrusive portions (not shown) around the rotational center O-O of the shaft 10 are integrally provided at equal intervals in correspondence with the arc-shaped protrusive portion (not shown) of the interposing member 6. On both end faces of the arc-shaped protrusive portion, the abutment faces of the electrically driven rotation range restricting mechanism are provided in correspondence with the abutment faces (not shown) of the interposing member 6, respectively.

The gear case 11 is comprised of a member with its high rigidity, for example, a resin containing nylon or a glass fiber or a carbon fiber. On the other face (a bottom face) of a bottom part of the gear case 11, a plurality of trapezoidal engagement recessed portions (not shown) which serve as engagement portions of the buffering mechanism, two pieces in this example, are integrally provided at equal intervals in correspondence with the engagement protrusive portions of the interposing member 6 on a circumference around the rotational center O-O of the shaft 10.

The electrically driven rotation range restricting mechanism is a mechanism for restricting a range of the electrically driven rotation of a mirror assembly. In other words, the electrically driven rotation range restricting mechanism is comprised of the abutment faces which are provided at the interposing member 6 and the shaft holder 9, and is a mechanism in which the abutment face of the interposing member 6 and the abutment face of the shaft holder 9 abut against each other, whereby the interposing member 6 is fixed to the shaft holder 9 and then the electrically driven rotation range of the mirror assembly 4 is restricted. The electrically driven rotation range, as shown in FIG. 1, is a range between a use location A and a storage location B. As a result, when one abutment face of the interposing member 6 and one abutment face of the shaft holder 9 abut against each other, the mirror assembly 4 is positioned in the use location A. Alternatively, when the other abutment face of the interposing member 6 and the other abutment face of the shaft holder 9 abut against each other, the mirror assembly 4 is positioned in the storage location B.

The buffering mechanism is a mechanism for rotating the mirror assembly 4 for the sake of buffering. In other words, the buffering mechanism is comprised of an engagement protrusive portion and an engagement recessed portion which are provided at the interposing member 6 and the gear case 11. This buffering mechanism is a mechanism in which, when the engagement protrusive portion of the interposing member 6 and the engagement recessed portion of the gear case 11 are disallowed to disengage from each other with the electrically driven rotation force, the interposing member 6 and the gear case 11 rotate together around the rotational center O-O of the shaft 10 relative to the shaft 10 and the shaft holder 9 in the electrically driven rotation range (a range between a use location A and a storage position B) and a force which is equal to or greater than the electrically driven rotation force has been applied in a forward F direction of a vehicle, the engagement protrusive portion of the interposing member 6 and the engagement recessed portion of the gear case 11 disengage from each other, and further, the clutch mechanism 15 is disengaged (a clutch protrusive portion 40 of the clutch gear 32 and a clutch recessed portion 41 of the clutch holder 35 are disengaged from each other, and the gear case 11 rotates in the counterclockwise direction seen from the top, around the rotational center O-O of the shaft 10 relative to the shaft 10 and the shaft holder 9.

Figure 5:
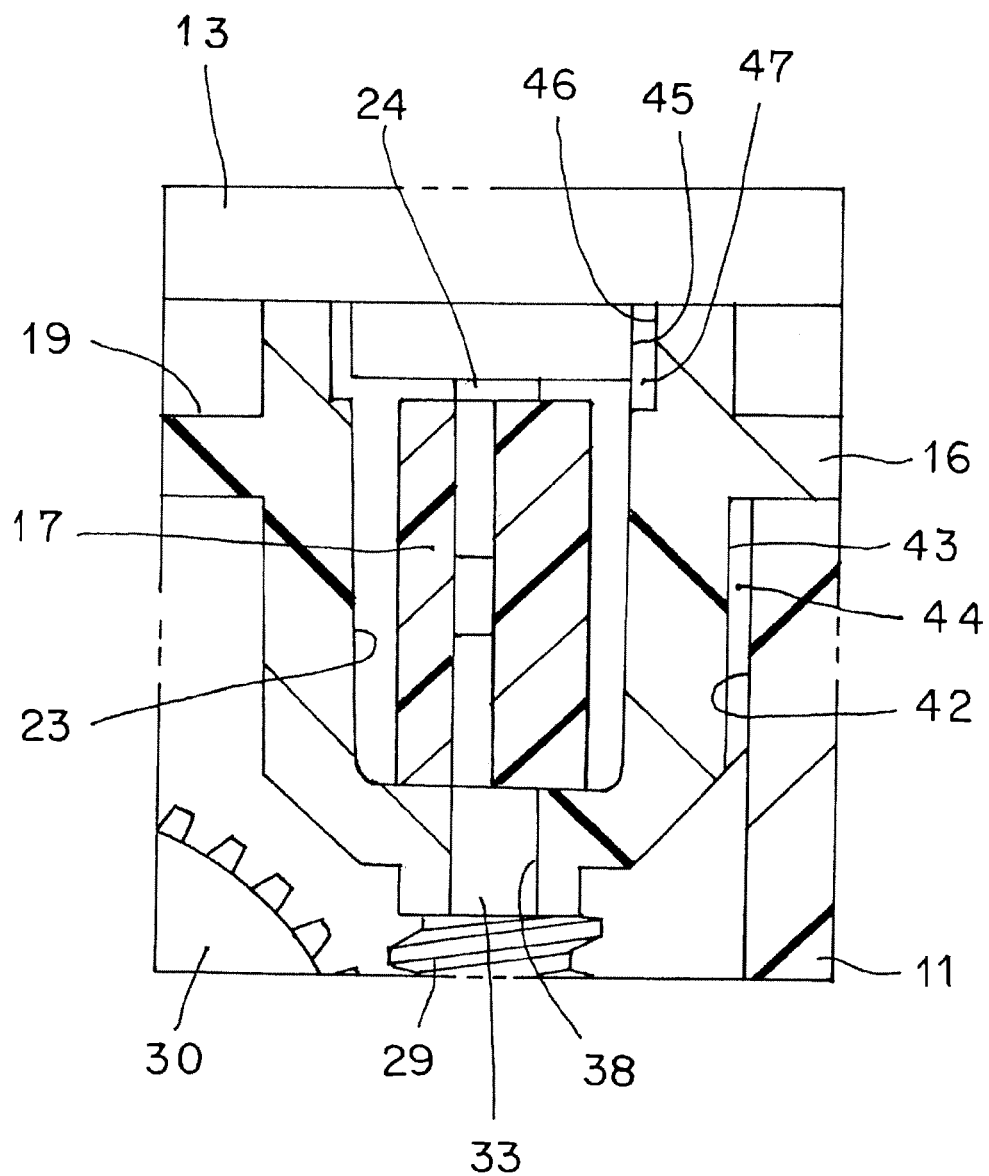
FIG. 5 is a partially enlarged longitudinal sectional view (a partially enlarged vertical sectional view) showing essential portions of an electrically driven storage unit, similarly.

As shown in FIG. 4 to FIG. 6, in the gear case 11 serving as a casing, an engagement recessed portion 42 formed in a cylindrical shape, serving as an engagement portion, is provided. In the joint housing portion 23 of the bearing member 16, a cylindrical engagement protrusive portion 43 serving as an engagement portion to engage with the engagement recessed portion 42 of the gear case 11 is provided. The joint housing portion 23 of the bearing member 16 and the engagement protrusive portion 43 are identical and are compatible with each other.

In the engagement recessed portion 42 of the gear case 11, the first worm gear 29 is housed. Of the engagement recessed portion 42 of the gear case 11, a site at which the helical gear 30 is opened.

As shown in FIG. 8, an outer diameter of the engagement protrusive portion 43 of the bearing member 16 is smaller than an inner diameter of the engagement recessed portion 42 of the gear case 11. On an outer circumferential face of the engagement protrusive portion 43 of the bearing member 16, a first press-in fixing protrusive portion 44 serving as a press-in fixing protrusive portion for casing bearing member is provided which is elastically deformed when the engagement protrusive portion 43 of the bearing member 16 is brought into press-in engagement with the inside of the engagement recessed portion 42 of the gear case 11, and which is fixed to be pressed into an inner circumferential face of the engagement recessed portion 42 of the gear case 11.

A height dimension of the first press-in fixing protrusive portion 44, as shown in FIG. 8 (A) has a dimension to an extent such that the inner circumferential face of the engagement recessed portion 42 of the gear case 11 is wrapped by dimension G. As a result, when the engagement protrusive portion 43 of the bearing member 16 is brought into press-in engagement with the inside of engagement recessed portion 42 of the gear case 11, the first press-in fixing protrusive portion 44, as shown in FIG. 8 (B), is elastically deformed by the wrapping dimension G and then is fixed to be pressed into the inner circumferential face of the engagement recessed portion 42 of the gear case 11.

As shown in FIG. 4, FIG. 5, and FIG. 7, in the housing of the motor 13, at the site at which the output shaft 24 protrudes, a cylindrical engagement protrusive portion 45 serving as an engagement portion is provided. Of the plate portion 19 of the bearing member 16, at an opening for communication between the motor housing portion 20 and the joint housing portion 23, a cylindrical engagement recessed portion 46 serving serves as an engagement portion to engage with the engagement protrusive portion 45 of the motor 13 is provided.

Figure 9A:
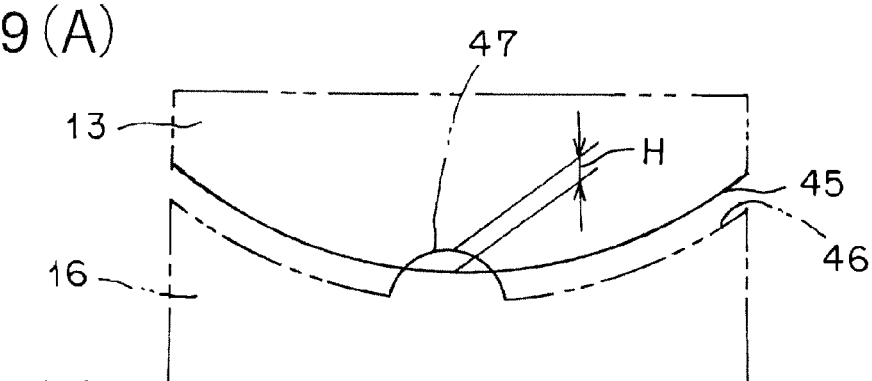
FIG. 9 is an explanatory view showing a state in which an engagement portion of a motor and an engagement portion of a bearing member are fixed to be pressed into each other, similarly.
Figure 9B:
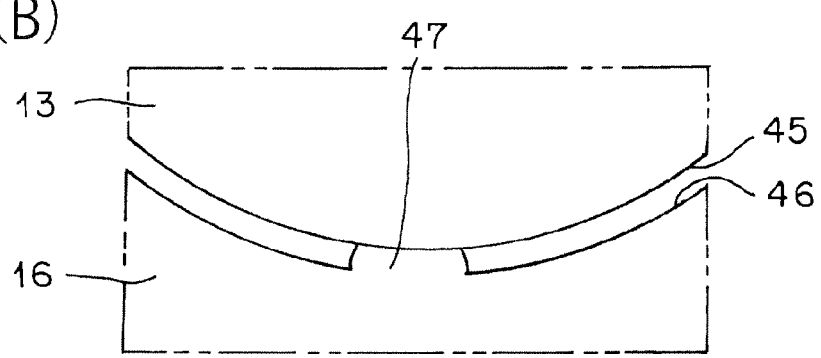

As shown in FIG. 9, an inner diameter of the engagement recessed portion 46 of the bearing member 16 is greater than an outer diameter of the engagement protrusive portion 45 of the motor 13. On the inner circumferential face of the engagement recessed portion 46 of the bearing member 16, a second press-in fixing protrusive portion 47 serving as a press-in fixing protrusive portion for motor bearing member is provided which is elastically deformed when the engagement protrusive portion 45 of the motor 13 is brought into press-in engagement with the inside of the engagement recessed portion 46 of the bearing member 16, and which is fixed to be pressed into the outer circumferential face of the engagement protrusive portion 45 of the motor 13.

A height dimension of the second press-in fixing protrusive portion 47, as shown in FIG. 9 (A), has a dimension to an extent such that the outer circumferential face of the engagement protrusive portion 45 of the motor 13 is wrapped by dimension H. As a result, when the engagement protrusive portion 45 of the motor 13 is brought into press-in engagement with the inside of the engagement recessed portion 46 of the bearing member 16, the second press-in fixing protrusive portion 47, as shown in FIG. 9 (B), is elastically deformed by the aforementioned wrapping dimension H and then is fixed to be pressed into the outer circumferential face of the engagement protrusive portion 45 of the motor 13.

The first press-in fixing protrusive portion 44 and the second press-in fixing protrusive portion 47 are formed in a rib shape that extends in the direction of the rotational center (line) O1 (O1-O1) of the first worm gear 29. The first press-in fixing protrusive portion 44 and the second press-in fixing protrusive portion 47 are provided at equal intervals, and a plurality of, at least three or more protrusive portions, or alternatively, in this example, six protrusive portions are provided.

(Description of Function)

The electrically driven storage type door mirror device 1 in this exemplary embodiment is made of the constituent elements as described above. Hereinafter, functions of the device will be described.

Figure 10:
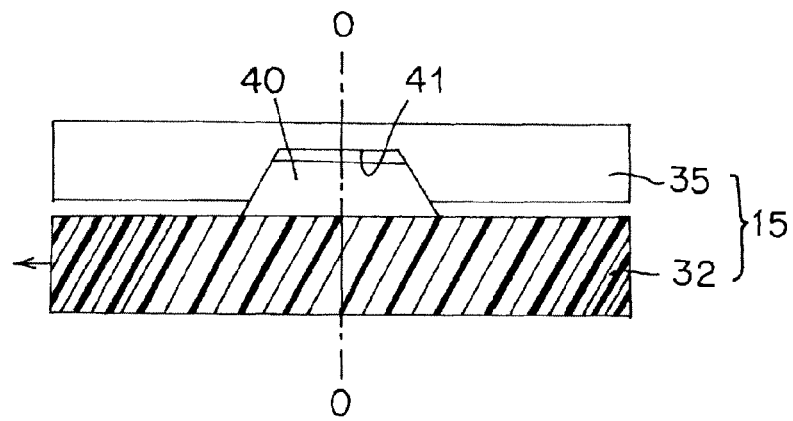
FIG. 10 is an explanatory view showing a state of connection between a clutch gear and a clutch holder, similarly.
Figure 13:
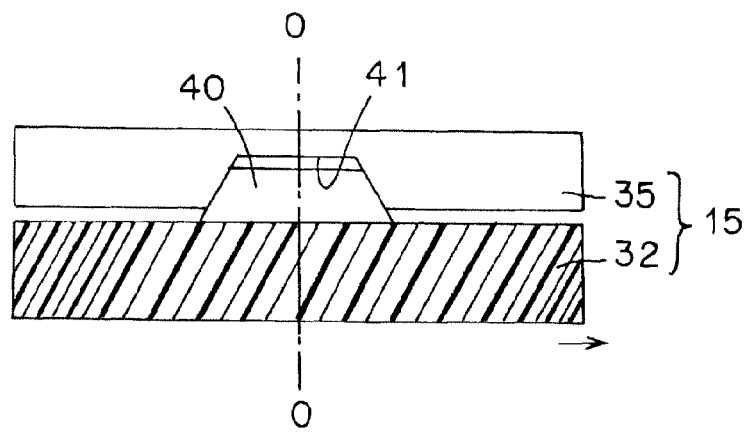
FIG. 13 is an explanatory view showing a state of connection between a clutch gear and a clutch holder, similarly.
Figure 14:
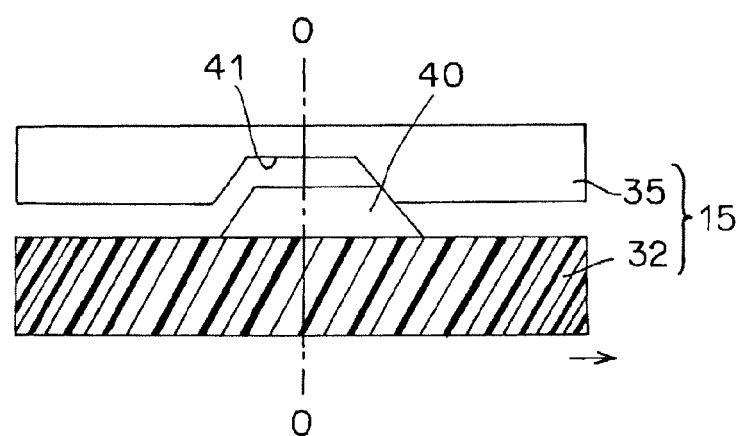
FIG. 14 is an explanatory view showing a state of connection between a clutch gear and a clutch holder when an external force is applied from a rear side to a mirror assembly, similarly.

First, a description will be given with respect to a case in which a mirror assembly 4 that is positioned in a use location A is electrically driven to be rotated and stored in a storage location B, as shown in FIG. 1. When the mirror assembly 4 is established in a state in which it is positioned in the use location A (in a set state or in a use state), the clutch mechanism 15, as shown in FIG. 10, FIG. 13, is established in a state in which a clutch protrusive portion 40 of a clutch gear 32 and a clutch recessed portion 41 of a clutch holder 35 are in an engaged state, so that the clutch gear 32 and the clutch holder 35 are in continuous state. Therefore, the clutch gear 32 is a state in which rotation is disabled relative to a shaft 10, together with the clutch holder 35.

In this set state (a use state), a switch (not shown) in an automobile room is operated and then power is fed to a motor 13 via a connector 8, a socket portion 7, and a board 27 so as to thereby drive the motor 13. Then, a rotation force of the motor 13 is transmitted to the clutch gear 32 that is fixed to the shaft 10 via an output shaft and a deceleration mechanism 14. At this time, the clutch gear 32 is established in a state in which rotation is disabled relative to the shaft 10, together with the clutch holder 35, so that a second worm gear 31 of the deceleration mechanism 14 rotates around a rotational center O-O of the shaft 10 with the clutch gear 32 serving as a fixing gear. By means of this rotation, the mirror assembly 4 having the electrically driven storage unit 3 incorporated therein, as shown in FIG. 1, rotates in the clockwise direction from a use location A to a storage location B around the rotational center O-O of the shaft 10.

When the mirror assembly 4 is positioned in the storage location B, a value of a current (an actuation current) which is supplied to the motor 13 rises and reaches a predetermined value; a switch circuit of the board 27 is actuated; and then, current supply to the motor 13 is interrupted. As a result, the mirror assembly 4 stops and is positioned in the storage location B that serves as a predetermined location shown in FIG. 1.

Next, a description will be given with respect to a case in which the mirror assembly 4 that is positioned in the storage location B is electrically driven to rotate and is returned to the use location A, as shown in FIG. 1. When the mirror assembly 4 is established in a state in which it is positioned in the storage location B (in a storage state), the clutch mechanism 15 is established in a connected state, as in its set state, so that the clutch gear 32 is established in a state in which rotation is disabled relative to the shaft 10, together with the clutch holder 35.

In this storage state, a switch (not shown) in an automobile room is operated to drive the motor 13. Then, a rotation force of the motor 13 is transmitted to the clutch gear 32 that is established in a state in which rotation is disabled via the deceleration mechanism 14. In this manner, the mirror assembly 4 having the electrically driven storage unit 3 incorporated therein, as shown in FIG. 1, rotates in the counterclockwise direction from the storage location B to the use location A around the rotational center O-O of the shaft 10.

When the mirror assembly 4 is positioned in the use location A, a value of a current (an actuation current) which is supplied to the motor 13 rises and reaches a predetermined value; a switch circuit of the board 27 is actuated; and then current supply to the motor 13 is interrupted. As a result, the mirror assembly 4 stops and is positioned in the use location A that serves as a predetermined location shown in FIG. 1.

Further, a description will be given with respect to a case in which the mirror assembly 4 that is positioned in the use location A is caused to tilt in a storage location B for the sake of buffering, as shown in FIG. 1. When the mirror assembly 4 is a state in which it is positioned in the use location A (in a set state or in a use state), the clutch mechanism 15 is established in a connected state, so that the clutch gear 32 is established in a state in which rotation is disabled relative to the shaft 10, together with the clutch holder 35.

In this set state (a use state), a force in the clockwise direction, the force being equal to or greater than an electrically driven rotation force exerted by the motor 13 and the deceleration mechanism 14 (a manual force and a force when something abuts against the mirror assembly 4), is applied to the mirror assembly 4 that is positioned in the use location A. Then, the gear case 11 that is mounted on the mirror assembly 4 is about to rotate in the clockwise direction. At this time, the interposing member 6 is not fixed to the shaft 10 and the shaft holder 9, so that the interposing member 6 can rotate in the clockwise direction around the rotational center O-O of the shaft 10, to the shaft 10 and the shaft holder 9.

Figure 11:
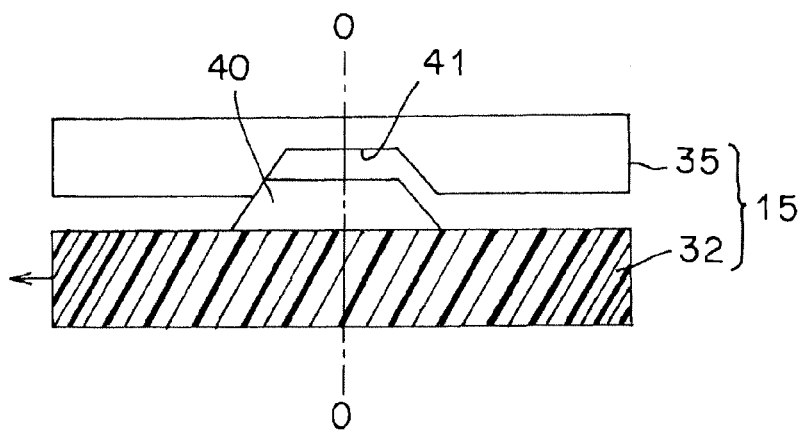
FIG. 11 is an explanatory view showing a state between a clutch gear and a clutch holder when an external force from a front side is applied to a mirror assembly, similarly.
Figure 12:
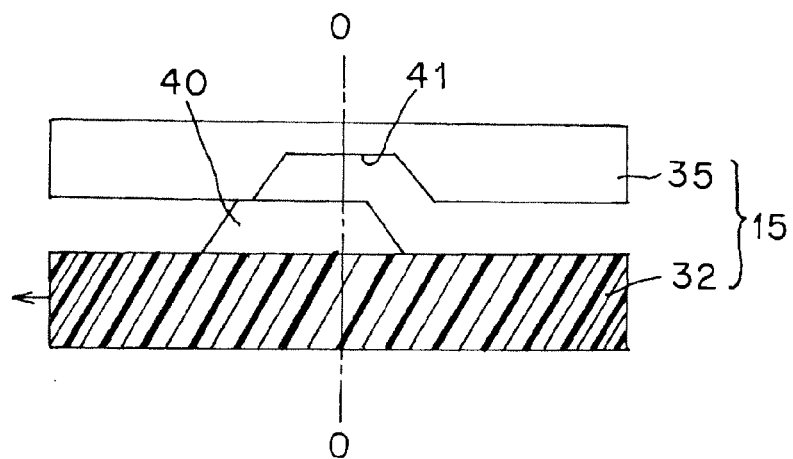
FIG. 12 is an explanatory view showing a state of disconnection between a clutch gear and a clutch holder, similarly.

Alternatively, the clutch holder 35 is engaged with the shaft 10 so as to disable rotation, and therefore, the clutch protrusive portion 40 of the clutch gear 32 at the side of the gear case 11 rolls on the clutch holder recessed portion 41 of the clutch holder 35 at the side at which the shaft 10 is fixed (refer to FIG. 11) and then the clutch protrusive portion 40 of the clutch gear 32 and the clutch holder recessed portion 41 of the clutch holder 35 disengage from each other (refer to FIG. 12). At this time, the clutch holder 35 moves (rises) against a resilience force of a spring 36.

As a result, the gear case 11 (including the cover 12, the motor 13, the deceleration mechanism 14, the bearing member 16, and the clutch gear 32) rotates in the clockwise direction. In this manner, as shown in FIG. 1, the mirror assembly 4 rotates in the clockwise direction from the use location A to the storage location B and then is positioned in the storage location B at a time point when one stopper face 22 of a stopper protrusive portion 21 of the shaft holder 9 has abutted against one stopper face of a guide groove of the gear case 11.

Then, as shown in FIG. 1, the mirror assembly 4 that is positioned in the storage location B is caused to rotate in the counterclockwise direction with a force which is greater than an electrically driven rotation force. Subsequently, the gear case 11 that is mounted to the mirror assembly 4 (including the cover 12, the motor 13, the deceleration mechanism 14, the bearing member 16, and the clutch gear 32) rotates in the clockwise direction, so that as shown in FIG. 1, the mirror assembly 4 rotates in the counterclockwise direction from the storage location B to the use location A.

The clutch protrusive portion 40 of the clutch gear 32 and the clutch holder recessed portion 41 of the clutch holder 35 then engage with each other and then the clutch mechanism 15 is established in its collected state. As a result, as shown in FIG. 1, the mirror assembly 4 is positioned in the use location A.

Further, a description will be given with respect to a case in which the mirror assembly 4 that is positioned in the use location A is caused to tilt in the forward tilting location C, as shown in FIG. 1. When the mirror assembly 4 is established in a state in which it is positioned in the use location A (in a set state or use state), the clutch mechanism 15 is established in a connected state, so that the clutch gear 32 is established in a state in which rotation is disabled relative to the shaft 10, together with the clutch holder 35.

In this set state (use state), a force in the counterclockwise direction, which is greater than an electrically driven rotation force exerted by the motor 13 and the deceleration mechanism 14, (a manual force or a force exerted when something hits against the mirror assembly 4), is applied to the mirror assembly positioned in a use location A. The gear case 11 that is mounted on the mirror assembly 4 is then about to rotate in the counterclockwise direction. At this time, the interposing member 6 is fixed to the shaft holder 9 to disable rotation in the counterclockwise direction.

Thus, a gear protrusive portion of the interposing member 6 and a gear recessed portion of the gear case 11 first disengage from each other. At this time, the gear case 11 (including the cover 12, the motor 13, the deceleration mechanism 14, the bearing member 16, the clutch gear 32, and the clutch holder 35), moves (rises) against the resilience force of the spring 36.

Then, the gear case 11 is further about to rotate in the counterclockwise direction (the direction indicated by the solid arrow in FIG. 11 and FIG. 13). A backlash between the clutch gear 32 and the second worm gear 31 is then clogged, a gap in a thrust direction of the second worm gear 31 is clogged, and an engagement gap between the shaft 10 and the clutch holder 35 is clogged.

Figure 15:
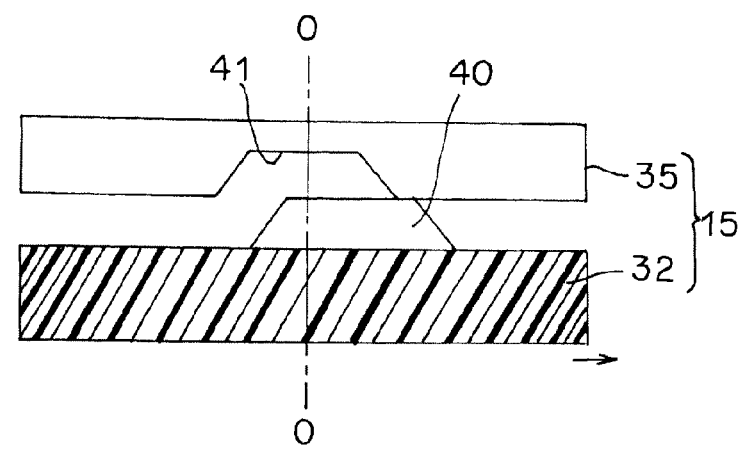
FIG. 15 is an explanatory view showing a state of disconnection between a clutch gear and a clutch holder, similarly.

The clutch holder 35 is engaged with the shaft 10 to disable rotation, and therefore, the clutch protrusive portion 40 of the clutch gear 32 at the side of the gear case 11 rolls on the clutch holder recessed portion 41 of the gear holder 35 at the side at which the shaft 10 is fixed (refer to FIG. 14) and then the clutch protrusive portion 40 of the clutch gear 32 and the clutch holder recessed portion 41 of the clutch holder 41 disengage with each other (refer to FIG. 15). At this time, the clutch holder 35 moves (rises) against the resilience force of the spring 36.

As a result, the gear case 11 (including the cover 12, the motor 13, the deceleration mechanism 14, the bearing member 16, and the clutch gear 32) rotates in the counterclockwise direction. In this manner, as shown in FIG. 1, the mirror assembly 4 rotates in the counterclockwise direction from the use location A to a forward tilt location C and then is positioned in the forward tilt location at a time point at which one stopper face 22 of the stopper protrusive portion 21 of the shaft holder 9 abuts against one stopper face of a guide groove of the gear case 11.

Then, as shown in FIG. 1, the mirror assembly 4 that is positioned in the forward tilting location C is caused to rotate in the clockwise direction. Subsequently, the gear case 11 that is mounted on the mirror assembly 4 (including the cover 12, the motor 13, the deceleration mechanism 14, the bearing member 16, and the clutch gear 32) rotates in the clockwise direction, so that as shown in FIG. 1, the mirror assembly 4 rotates in the clockwise direction from the forward tilting location C to the use location A.

Afterwards, the clutch protrusive portion 40 of the clutch gear 32 and the clutch recessed portion 41 of the clutch holder 35 are first engage with each other and then the clutch mechanism 15 is established in a connected state. After that, the gear protrusive portion of the interposing member 6 and the gear recessed portion of the gear case 11 are geared with each other and then the interposing member 6 and the gear case 11 are integrated with each other. As a result, as shown in FIG. 1, the mirror assembly 4 is positioned in the use location A.

DESCRIPTION OF ADVANTAGEOUS EFFECT(S)

An electrically driven storage type door mirror device 1 in the exemplary embodiment is made of the constituent elements and functions as described above. Hereinafter, the advantageous effects of the device will be described.

According to the electrically driven storage type door mirror device 1 in the exemplary embodiment, when the engagement protrusive portion 43 of the bearing member 16 is brought into press-in engagement with the inside of the engagement recessed portion 42 of the gear case 11, the first press-in fixing protrusive portion 44 on the outer circumferential face of the engagement protrusive portion 43 of the bearing member 16 is elastically deformed and then is fixed to be pressed into the inner circumferential face of the engagement recessed portion 42 of the gear case 11. Thus, the electrically driven storage type door mirror device 1 in the exemplary embodiment is capable of absorbing a manufacture tolerance (manufacture dispersion) in gear case 11 and bearing member 16, wherein the gear case 11 and the bearing member 16 are reliably fixed to each other without a backlash, so that the rotational center (the rotational centerline) O1 of the gear case 11 and the first worm gear 29 that is borne on the bearing member 16 can be positioned at the normal rotational center (the rotational centerline). In this manner, the electrically driven storage type door mirror device 1 in the exemplary embodiment is capable of eliminating or reducing dispersion in distance I between the rotational center O1 of the first worm gear 29 and the rotational center (the rotational centerline) O2 (O2-O2) of the helical gear 30 to its required minimum. As a result, smooth transmission of rotational force is performed between the first worm gear 29 and the helical gear 30, making it possible to eliminate or reduce a load on the respective constituent elements or generation of an actuation noise to its required minimum.

Moreover, according to the electrically driven storage type door mirror device 1 in the exemplary embodiment, the first press-in fixing protrusive portion 44 is provided on the outer circumferential face of the engagement protrusive portion 43 of the bearing member 16, and therefore, there would be no worrying about a case in which the number of parts increase and then manufacturing costs increase.

In addition, according to the electrically driven storage type door mirror device 1 in the exemplary embodiment, the first press-in fixing protrusive portion 44 of the casing bearing member 16 that is formed of a member that is softer in material rigidity than the gear case 11, is elastically deformed and then is fixed to be pressed into the inner circumferential face of the engagement recessed portion 42 of the gear case 11. Thus, the vehicle outside mirror device 1 in the exemplary embodiment is capable of further reliably absorbing a manufacture tolerance (manufacture dispersion) in the gear case 11 and the bearing member 16, making it possible to further eliminate or reduce a load on the respective constituent elements or generation of an actuation noise to its required minimum.

Moreover, according to the electrically driven storage type door mirror device 1 in the exemplary embodiment, the gear case 11 is formed of a member that is harder in material rigidity than the bearing member 16, and therefore, the helical gear 30 is rotatably borne on the gear case 11, whereby the gear case 11 is hardly affected by a resistive force of the helical gear 30, for example. As a result, it becomes possible to further eliminate a load on the respective constituent elements or generation of an actuation noise to its required minimum.

Further, according to the electrically driven storage type door mirror device 1 in the exemplary embodiment, when the engagement protrusive portion 45 of the motor 13 and the engagement recessed portion 46 of the bearing member 16 are brought into press-in engagement with each other, the second press-in fixing protrusive portion 47 on the inner circumferential face of the engagement recessed portion 46 of the bearing member 16 is elastically deformed and then is fixed to be pressed into the outer circumferential face of the engagement protrusive portion 45 of the motor 13. Thus, the electrically driven storage type door mirror device 1 in the exemplary embodiment is capable of absorbing a manufacture tolerance (manufacture dispersion) in the motor 13 and the bearing member 16, wherein the motor 13 and the bearing member 16 are reliably fixed to each other with a backlash, so that the rotational center (the rotational centerline) O1 of the first worm gear 29 that is coupled to the motor 13, and is borne on the bearing member 16, can be further precisely positioned on the normal rotational center (the rotational centerline). In this manner, the electrically driven storage type door mirror device 1 in the exemplary embodiment is capable of eliminating or reducing dispersion in distance I between the rotational center O1 of the first worm gear 29 and the rotational center O2 of the helical gear 30 to its required minimum. As a result, smooth transmission of rotational force is performed between the first worm gear 29 and the helical gear 30, making it possible to further eliminate or reduce a load on the respective constituent elements or generation of an actuation noise to its minimum.

Moreover, according to the electrically driven storage type door mirror device 1 in the exemplary embodiment, the second press-in fixing protrusive portion 47 is provided on the inner circumferential face of the engagement recessed portion 46 of the bearing member 16, and therefore, there would be no worrying about a case in which the number of parts increases and then manufacturing costs increase.

Furthermore, according to the electrically driven storage type door mirror device 1 in the exemplary embodiment, the second press-in fixing protrusive portion 47 of the bearing member 16 that is formed of a member that is softer in material rigidity than the motor 13 is elastically deformed and then is fixed to be pressed into the outer circumferential face of the engagement protrusive portion 45 of the motor 13. Thus, the electrically driven storage type door mirror device 1 in the exemplary embodiment is capable of further reliably absorbing a manufacture tolerance (manufacture dispersion) in the motor 13 and the bearing member 16, making it possible to further eliminate or reduce a load on the respective constituent elements or generation of an actuation noise to its minimum.

Still furthermore, according to the electrically driven storage type door mirror device 1 in the exemplary embodiment, the first press-in fixing protrusive portion 44 and the second press-in fixing protrusive portion 47 are formed in a rib shape that extends in the direction of the rotational center (the rotational centerline) O1 of the first worm gear 29, and are provided in at least three, so that the rotational center (the rotational centerline) O1 of the first worm gear 29 can be further precisely positioned at the normal rotational enter (the rotational centerline). In this manner, the electrically driven storage type door mirror device in the exemplary embodiment is capable of further eliminating or reducing dispersion in distance I between the rotational center O1 of the first worm gear 29 and the rotational center O2 of the helical gear 30 to its required minimum. As a result, smooth transmission of rotational force is performed between the first worm gear 29 and the helical gear 30, making it possible to further eliminate or reduce a load on the respective constituent elements or generation of an actuation noise to its minimum.

DESCRIPTION OF EXAMPLES OTHER THAN EXEMPLARY EMBODIMENT

In the foregoing exemplary embodiment, an electrically driven storage type door mirror device has been described. However, the present invention can also be applied to a vehicle outside mirror device other than the electrically driven storage type door mirror. For example, the present invention can be applied to a vehicle outside mirror device of electrically driven storage type such as a vehicle fender mirror device of electrically driven storage type.

In the exemplary embodiment described previously, the first press-in fixing protrusive portion 44 is provided on the outer circumferential face of the engagement protrusive portion 43 of the bearing member 16. However, in the present invention, the first press-in fixing protrusive portion 44 may be provided on the inner circumferential face of the engagement recessed portion 42 of the gear case 11, or alternatively, the first press-in fixing protrusive portion 44 may be provided on the outer circumferential face of the engagement protrusive portion 43 of the bearing member 16 and on the inner circumferential face of the engagement recessed portion 42 of the gear case 11.

Further, in the exemplary embodiment described previously, the second press-in fixing protrusive portion 47 is provided on the inner circumferential face of the engagement recessed portion 46 of the bearing member 16. However, in the present invention, the second press-in fixing protrusive portion 47 may be provided on the outer circumferential face of the engagement protrusive portion 45 of the motor 13, or alternatively, the second press-in fixing protrusive portion 47 may be provided on the inner circumferential face of the engagement recessed portion 46 of the bearing member 16 and on the outer circumferential face of the engagement protrusive portion 45 of the motor 13.

What is claimed is:

1. A vehicle outside mirror device in which a mirror assembly is rotatably mounted on a vehicle body via an electrically driven storage unit and a case,
    the electrically driven storage unit comprising:
        a shaft holder that is fixed to a base;
        a shaft that is provided on the shaft holder;
        a casing which is rotatably mounted on the shaft, and in which the mirror assembly is to be mounted;
        a motor and rotational force transmission mechanism that are housed in the casing, for electrically driving the mirror assembly to rotate relative to the shaft; and
        a bearing member that is housed in the casing, wherein
    the rotational force transmission mechanism having:
        at least a gear at a first step, which is rotatably borne on the casing and the bearing member, the gear being coupled to an output shaft of the motor; and a gear at a second step, which is geared with the gear at the first step,
    at the casing and at the bearing member, engagement portions configured to engage with each other are respectively provided, and
    at least one of the engagement portion of the casing and the engagement portion of the bearing member, a press-in fixing protrusive portion for engaging the casing with the bearing member is provided which is elastically deformed and then is fixed to be pressed into an engagement portion of an other of the engagement portion of the casing and the engagement portion of the bearing member when the engagement portion of the casing and the engagement portion of the bearing member are brought into press-in engagement with each other,
    wherein
    at the motor and the bearing member, engagement portions configured to engage with each other are respectively provided, and
    at least one of the engagement portion of the motor and the engagement portion of the bearing member, there is a press-in fixing protrusive portion for engaging the motor with the bearing member, which is elastically deformed and then is fixed to be pressed into an engagement portion of an other of the engagement portion of the motor and the engagement portion of the bearing member when the engagement portion of the motor and the engagement portion of the bearing member are brought into press-in engagement with each other.

2. The vehicle outside mirror device according to claim 1, wherein
    the bearing member is formed of a member that is softer in material rigidity than the casing, and
    the press-in fixing protrusive portion for engaging the casing with the bearing member is provided at the bearing member.

3. The vehicle outside mirror device according to claim 1, wherein
    the bearing member is formed of a member that is softer in material rigidity than the motor, and
    the press-in fixing protrusive portion for engaging the motor with the bearing member is provided at the bearing member.

4. The vehicle outside mirror device according to claim 1, wherein
    the press-in fixing protrusive portion for engaging the casing with the bearing member and the press-in fixing protrusive portion for engaging the motor with the bearing member are formed in a rib shape that extends in a direction of a rotational centerline of the gear at a first step and at least three protrusive portions are provided.

5. A vehicle outside mirror device in which a mirror assembly is rotatably mounted on a vehicle body via an electrically driven storage unit and a base,
    the electrically driven storage unit comprising:
        a shaft holder that is fixed to the base;
        a shaft that is provided on the shaft holder;
        a casing which is rotatably mounted on the shaft, and in which the mirror assembly is to be mounted;
        a motor and a rotational force transmission mechanism that are housed in the casing, for electrically driving the mirror assembly to rotate relative to the shaft; and
        a bearing member that is housed in the casing, the bearing member comprises a motor housing portion for housing and fixing the motor, wherein the rotational force transmission mechanism having:
  at least a gear at a first step, which is rotatably born on the casing and the bearing member, the gear being coupled to an output shaft of the motor; and
  a gear at a second step, which is geared with the gear at the first step,
wherein:
  at the casing and at the bearing member, engagement portions configured to engage with each other are respectively provided, and
  at least one of the engagement portion of the casing and the engagement portion of the bearing member, a first press-in fixing protrusive portion for engaging the casing with the bearing member is provided which is elastically deformed and then is fixed to be pressed into an engagement portion of an other of the engagement portion of the casing and the engagement portion of the bearing member when the engagement portion of the casing and the engagement portion of the bearing member are brought into press-in fixing with each other,
  the bearing member comprises a joint housing portion for housing a joint adapted to couple the gear at the first step and a shaft portion, and wherein the engagement portion of the bearing member is provided adjacent the joint housing portion in order to position a rotational center of the gear at the first step that is coupled to the output shaft of the motor, at a normal rotational center.

* * * * *